United States Patent
Ishigaki et al.

(10) Patent No.: US 9,923,372 B2
(45) Date of Patent: Mar. 20, 2018

(54) ENERGY MANAGEMENT SYSTEM

(71) Applicant: TOYOTA MOTOR ENGINEERING & MANUFACTURING NORTH AMERICA, INC., Erlanger, KY (US)

(72) Inventors: Masanori Ishigaki, Ann Arbor, MI (US); Atsushi Iwai, Novi, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 280 days.

(21) Appl. No.: 14/670,138

(22) Filed: Mar. 26, 2015

(65) Prior Publication Data
US 2016/0282832 A1  Sep. 29, 2016

(51) Int. Cl.
*H02J 7/00* (2006.01)
*H02J 3/18* (2006.01)
*H02J 3/32* (2006.01)
*H02J 3/38* (2006.01)
*H02J 3/00* (2006.01)

(52) U.S. Cl.
CPC .............. *H02J 3/18* (2013.01); *H02J 3/32* (2013.01); *H02J 3/381* (2013.01); *G05B 2219/2639* (2013.01); *H02J 2003/003* (2013.01)

(58) Field of Classification Search
CPC .................. G05B 19/106; H02J 3/18
USPC ............................................. 700/295
See application file for complete search history.

(56) References Cited

U.S. PATENT DOCUMENTS

| | | | |
|---|---|---|---|
| 7,315,769 B2 | 1/2008 | Balan et al. | |
| 7,787,272 B2 | 8/2010 | Lasseter et al. | |
| 7,834,479 B2 | 11/2010 | Capp et al. | |
| 8,841,787 B1 | 9/2014 | Folken et al. | |
| 2008/0072090 A1* | 3/2008 | O'Connor | G06F 1/26 713/330 |
| 2010/0121511 A1* | 5/2010 | Onnerud | B60L 11/1851 701/22 |
| 2012/0187753 A1* | 7/2012 | Schaffnit | B60L 11/1842 307/9.1 |
| 2012/0319657 A1* | 12/2012 | Ke | H02J 7/0021 320/134 |
| 2013/0009602 A1* | 1/2013 | Hoff | H02J 7/0021 320/126 |
| 2013/0181680 A1* | 7/2013 | Chau | B60L 3/0046 320/134 |
| 2013/0320772 A1* | 12/2013 | Qiao | H01M 10/04 307/87 |

(Continued)

OTHER PUBLICATIONS

U.S. Appl. No. 14/447,753, filed Jul. 31, 2014, Ishigaki.

*Primary Examiner* — Vincent Tran
(74) *Attorney, Agent, or Firm* — Oblon, McClelland, Maier & Neustadt, L.L.P.

(57) ABSTRACT

A system includes energy modules configured to output power to an energy management bus based on load demands. A power storage device is configured to compensate for power transients at the energy management bus. The system also includes control circuitry configured to process sensor data to determine load sharing curves for the energy modules based on load demands, align the energy modules to output power based on the load sharing curves to the energy management bus, and provide power to one or more loads at one or more predetermined voltages.

19 Claims, 16 Drawing Sheets

(56) References Cited

U.S. PATENT DOCUMENTS

| | | | |
|---|---|---|---|
| 2014/0125284 A1* | 5/2014 | Qahouq | H02J 7/0065 320/118 |
| 2014/0175886 A1* | 6/2014 | Kwok | H02J 7/34 307/46 |
| 2014/0239723 A1* | 8/2014 | Beg | H02J 3/46 307/53 |
| 2014/0342193 A1* | 11/2014 | Mull | H01M 10/4257 429/50 |
| 2014/0354234 A1 | 12/2014 | Sudan et al. | |
| 2015/0048673 A1* | 2/2015 | Chintala | B60L 1/00 307/9.1 |
| 2016/0020473 A1* | 1/2016 | King | H01M 8/04619 307/10.1 |
| 2016/0046200 A1* | 2/2016 | Timmons | B60L 11/1855 318/139 |
| 2016/0049809 A1* | 2/2016 | Kajitani | H02J 7/02 320/118 |

* cited by examiner

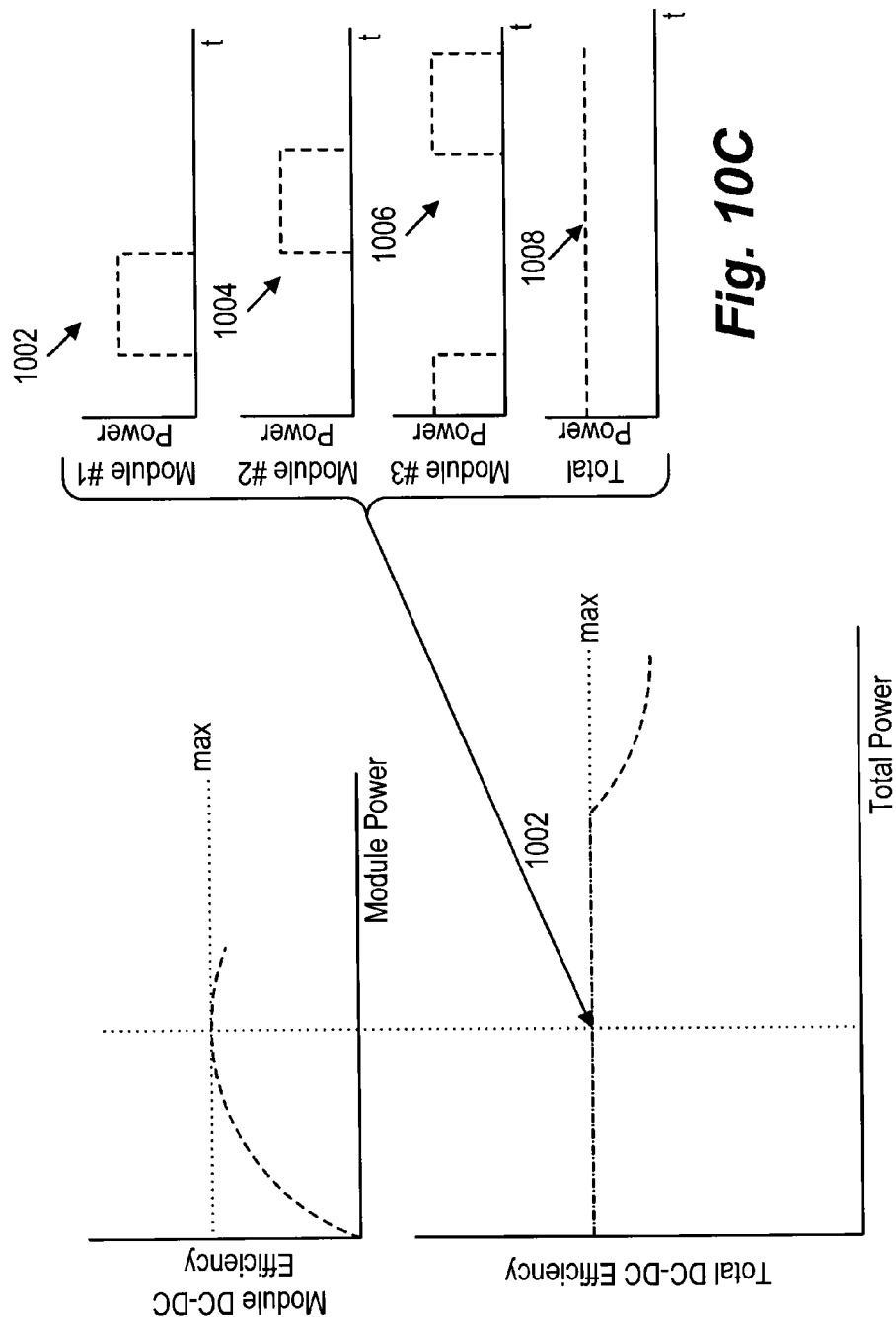

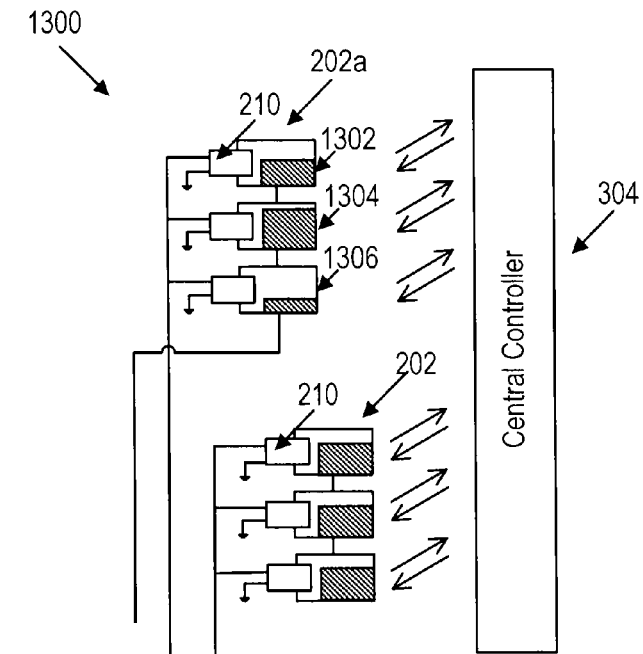
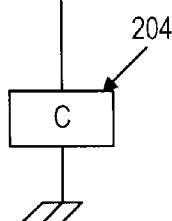
Fig. 13A
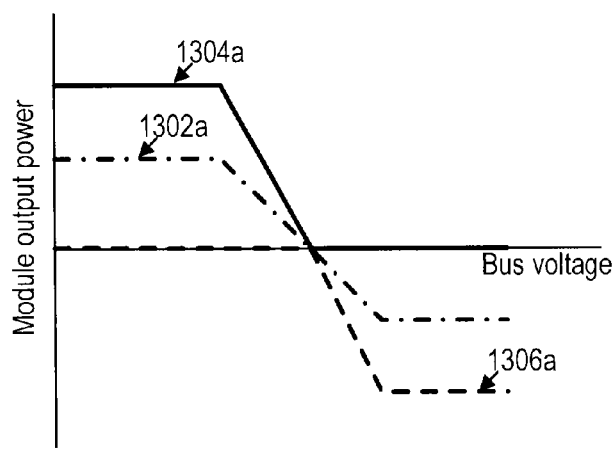
Fig. 13B
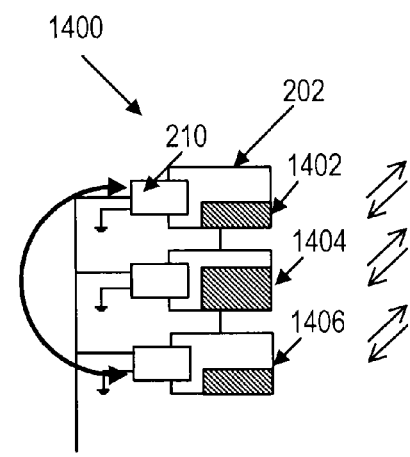
Fig. 14

ENERGY MANAGEMENT SYSTEM

BACKGROUND

Energy management systems respond to changes in load demand by modifying amounts of voltage and power supplied by power sources to a common bus. U.S. Patent Application Publication No. 2014/0354234 A1 entitled "Control, Protection, and Power Management System for an Energy Storage System" by Sudan et al. describes an energy management system that controls power transfer between a host power system, local loads, and an energy storage system.

SUMMARY

In an exemplary implementation, a system can include energy modules that can output power to an energy management bus based on load demands. An power storage device can compensate for power transients at the energy management bus. The system can also include control circuitry configured to process sensor data to determine load sharing curves for the energy modules based on load demands; align the energy modules to output power based on the load sharing curves to the energy management bus; and provide power to one or more loads at one or more predetermined voltages.

The system can align the energy modules to output power to a vehicle drive train. The system can also align one or more additional energy modules to the vehicle drive train to increase at least one of driving range and driving power.

The energy modules can include at least one power source that can provide power to at least one of the energy management bus and the vehicle drive train; DC-DC power conversion circuitry that can convert a voltage of the at least one power source to a voltage of the energy management bus; and at least one sensor device that can measure at least one of temperature, voltage, current, rate of power discharge, and state of charge for the energy modules.

Non-isolated DC-DC power conversion circuitry can be aligned to transfer power from the energy management bus to the one or more electrical loads. In addition, redundant paths of power transfer can be provided to the one or more electrical loads from the energy management bus.

The energy modules can include battery modules having at least one battery cell. The control circuitry can determine the load sharing curves for the energy modules based on a state of charge (SOC) of the at least one battery cell. The control circuitry can also identify the energy modules having one or more battery cells with a temperature less than an optimal temperature for battery operation and align the energy modules to circulate current between the energy modules having the one or more battery cells with the temperature less than the optimal temperature for battery operation. The energy modules can also include at least one of solar energy modules, AC charging modules, and fuel cell modules.

The system can select one or more of the energy modules to provide power to one or more auxiliary loads when the system is in a standby mode. The system can also electrically disconnect one or more damaged energy modules from the system.

The system can also operate the energy modules at a predetermined efficiency by modifying duty cycles of the energy modules.

The system can also include a lead battery to provide power to the one or more electrical loads. The power storage device can reduce stress on the lead battery and the energy modules by outputting power or absorbing power in response to the power transients at the energy management bus.

The system can also align the energy modules as electrical loads during battery cell charging operations.

A further exemplary implementation can include a system controller with circuitry that can process sensor data to determine load sharing curves for the energy modules based on load demands; align the energy modules to output power based on the load sharing curves to the energy management bus; and provide power to one or more loads at one or more predetermined voltages.

A further exemplary implementation includes a means for compensating for power transients at an energy management bus; means for processing sensor data to determine load sharing curves for energy modules based on load demands; means for aligning the energy modules to output power based on the load sharing curves to the energy management bus; and means for providing power to one or more loads at one or more predetermined voltages.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 10A-10C are exemplary graphs that illustrate module efficiency;

FIGS. 13A-13B are exemplary illustrations of battery state of charge control in a modular energy management system;

FIG. 14 is an exemplary illustration of battery temperature control in an modular energy management system;

DETAILED DESCRIPTION

Figure 1:
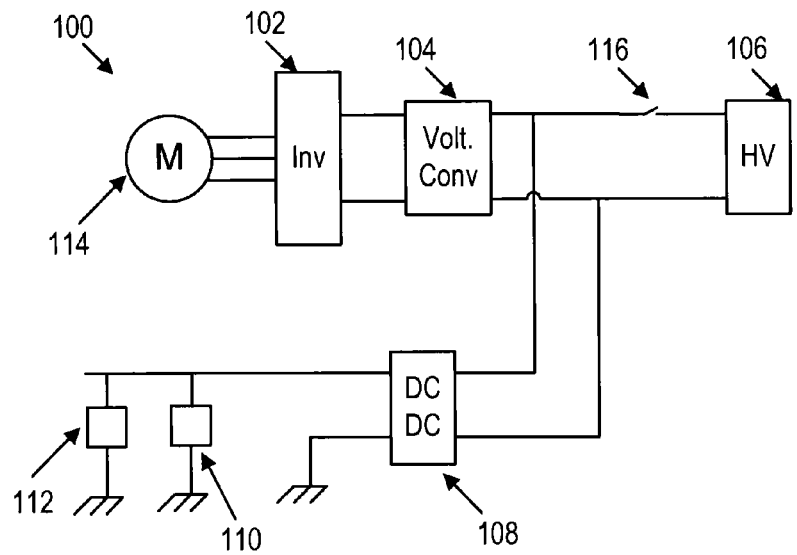
FIG. 1 is an exemplary illustration of a prior art energy management system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary illustration of a prior art energy management system 100 for a hybrid vehicle (HV). The energy management system 100 controls transfer of electric energy from a high voltage battery pack 106 to an inverter 102 and motor 114 as well as one or more electrical loads 110 of the vehicle. Throughout the disclosure, the inverter 102 and motor 114 are interchangeably referred to as the vehicle drive train. The high voltage battery pack 106 is connected to the vehicle drive train via a high voltage relay 116 as well as a voltage converter 104 that converts the power supplied by the high voltage battery pack 106 to a voltage and current that corresponds to the voltage and current characteristics of the vehicle drive train. The energy management system also includes an isolated DC-DC converter 108 that controls power flow from the high voltage battery pack 108 to the one or more electrical loads 110 that may have lower voltage and current characteristics than the high voltage battery pack 110. The energy management system 100 also includes a lead (Pb) battery that also supplies power to the one or more electrical loads 110.

Figure 2:
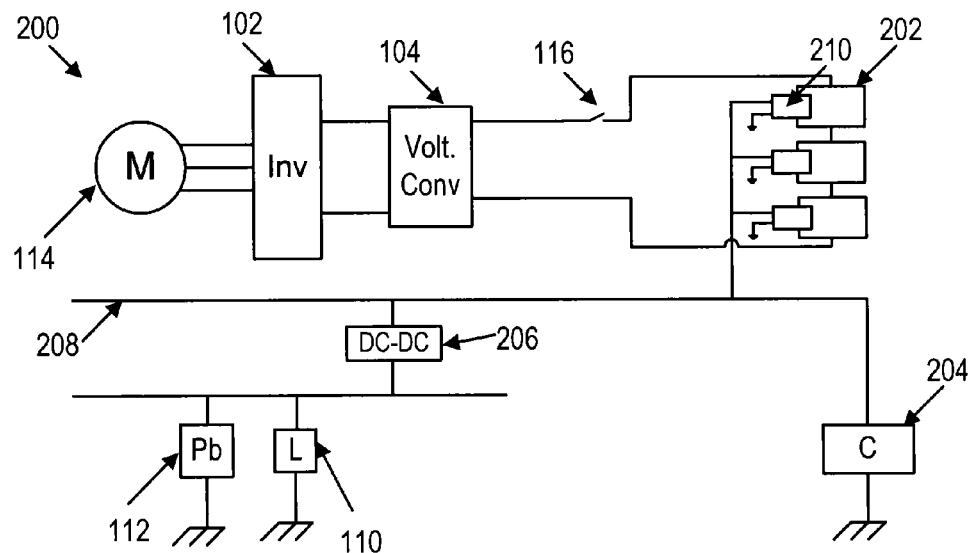
FIG. 2 is an exemplary illustration of a modular energy management system.

FIG. 2 is an exemplary illustration of a modular energy management system 200 for a HV. The modular energy management system 200 includes at least one battery module 202 that provides power to the inverter 102 and motor 114 via the voltage converter 104 and high voltage relay 116. In some implementations, the high voltage relay 116 includes at least one switch aligns power to the vehicle drive train based on a control signal from a central controller. In addition, the at least one battery module 202 is an energy module that includes at least one battery cell, a local controller, and a modular isolated DC-DC converter 210 that converts the DC voltage from the battery module 202 to an energy management bus 208. In some implementations, the modular isolated DC-DC converter 210 converts a higher DC voltage at the at least one battery module 202 to a lower voltage at the energy management bus 208. The at least one battery module 202 can be connected in series or parallel based on the power specifications of the modular energy management system 200.

The central controller and local controllers for the at least one battery module 202 manage the power output from the at least one battery module 202 as well as power demands of the one or more electrical loads 110 to provide droop control for the energy management bus 208. In addition, the local controllers for the at least one battery module 202 communicate information to the central controller that includes diagnostic information, state of charge (SOC), rate of discharge, and the like. Details regarding operation of the central controller and local controllers are discussed further herein.

In some implementations, the energy management bus 208 is a DC bus that connects the at least one battery module 202 to the one or more electrical loads 110 via a DC-DC converter 206. In some aspects, the DC-DC converter 206 is a non-isolated DC-DC converter that can perform DC-DC conversion at higher speeds than isolated DC-DC converters. The DC-DC converter 206 can convert a higher DC voltage at the energy management bus 208 to a lower voltage that corresponds to the voltage of the one or more electrical loads 110.

In addition, a power storage device 204 is also connected to the energy management bus 208. In some implementations, the power storage device 204 can be a capacitor, an electric double layer capacitor (EDLC), a lithium-ion capacitor, or any other type of power storage device. The type of power storage device 204 used in the modular energy management system 200 can be based on rates of power transfer and how much of an effect power transients have on the energy management bus 208. The power storage device 204 can reduce the effects of power transients that occur at the energy management bus 208 and assist in maintaining an approximately constant average voltage at the energy management bus 208. In some aspects, the effects of power transients on the energy management bus 208 can be referred to as "peaky power." By reducing the effects of peaky power on the energy management bus 208, the power storage device 204 reduces stresses on the at least one battery module 202 and the Pb battery 112.

For example, power demands of the one or more electrical loads 110 can vary based on the number of energized loads, load settings, and the like. As the load demands on the modular energy management system 200 change, a response time by the modular isolated DC-DC converter 210 of the at least one battery module 202 that is slower than the increase in load demand may cause power transients to develop at the energy management bus 208. Stored energy from the power storage device 204 can be output to reduce the magnitude of the power transients. The power storage device 204 can also absorb excess power as load demands on the modular energy management system 200 are reduced. The modular energy management system 200 also includes a lead (Pb) battery that also supplies power to the one or more electrical loads 110.

Figure 3:
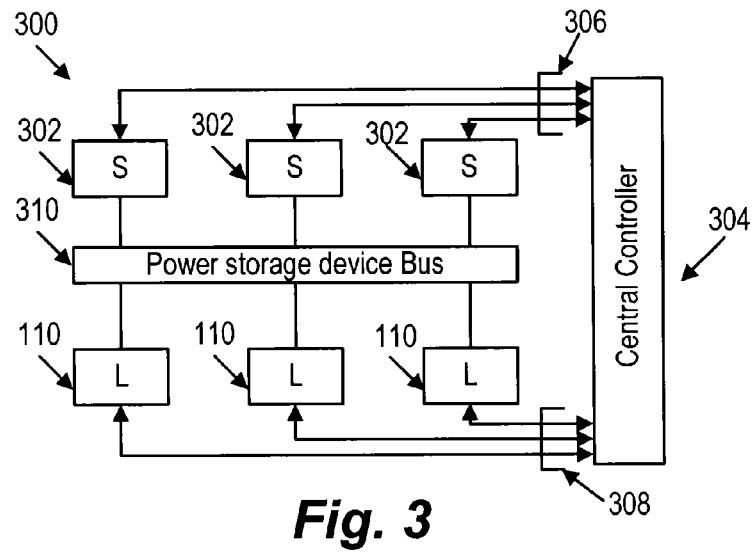
FIG. 3 is an exemplary block diagram of modular energy management system control.

FIG. 3 is an exemplary block diagram 300 of modular energy management system control. For example, one or more energy modules 302 supply power to the one or more electrical loads 110 based on control signals received from a central controller 304. The central controller 302 can be an electronic control unit (ECU) with control circuitry that determines rates of power transfer for the sources 302 to the one or more electrical loads 110. The central controller 304 also issues control signals to align power flow from energy modules 302 to the one or more electrical loads 110 based on current demands of the modular energy management system 200.

The energy modules 302 can include the at least one battery module 202 as well as other types of power sources installed in the vehicle, such as solar panels, a charging station connection, the like. In addition, the power storage device bus 310 can supply power to the one or more electrical loads during power transients that occur as the load demands of the modular energy management system 300 change. The central controller 304 receives diagnostic signals 308 from the one or more electrical loads 110 that include at least one of on/off statuses, settings, bus voltage, power output, and the like. The central controller 304 also receives status signals 306 from the one or more energy modules 302 that include identification information, SOC, estimated time until charge is less than a predetermined threshold, output voltage and current, output power, and the like. The status signals 306 from the energy modules 302 and the diagnostic signals 308 from the one or more electrical loads 110 are communicated to the central controller via wired and/or wireless communications.

Figure 4:
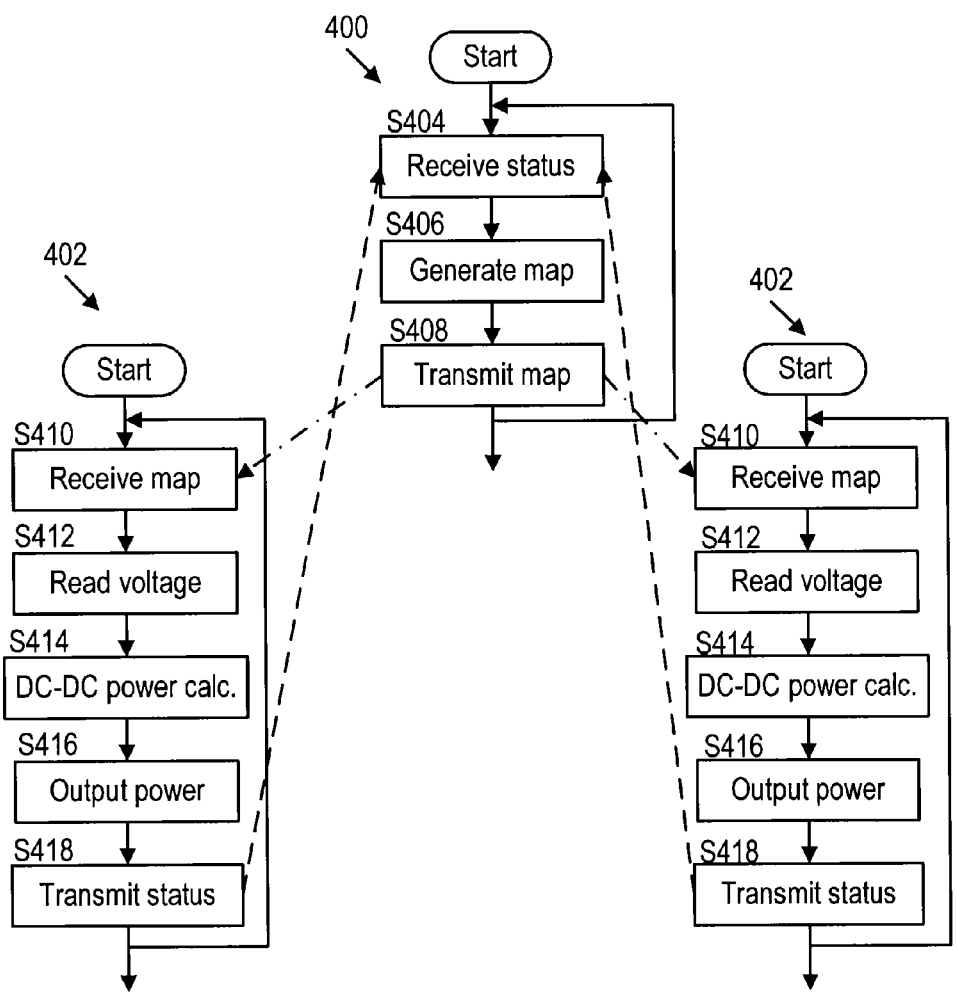
FIG. 4 illustrates exemplary flowcharts for energy management control processes.

FIG. 4 illustrates exemplary flowcharts for energy management control processes. Central control process 400 illustrates a flowchart of energy management control by the central controller 304, and module control process 402 illustrates a flowchart of energy management control by the local controllers of the one or more energy modules 302. At step S404 of the central control process 400, the central controller 304 receives status signals 306 from the one or more energy modules 302. For example, for a battery module 202, the central controller 304 can receive a status signal 306 that includes a rate discharge of the battery cells within the battery module as well as a current SOC of the battery cells.

At step S406, voltage-power (V-P) maps for each of the energy modules 302 are generated by the control circuitry of the central controller 304 based on a current status of the energy modules 302 and load demands on the modular energy management system 200. In some implementations, the V-P maps for the one or more energy modules 302 represent load sharing curves that indicate a percentage of the total load demand supplied by each energy module. In addition, the V-P maps generated by the central controller 304 can be unique to each energy module 302 in the modular energy management system 200. For example, the battery cells in one battery module 202 may be more highly charged than the battery cells in another battery module 202. The V-P map transmitted from the central controller 304 to the local controller for the more highly charged battery module 202 may indicate that the more highly charged battery module 202 can output a higher quantity of power to the energy management bus 208 than other battery modules.

Figure 5:
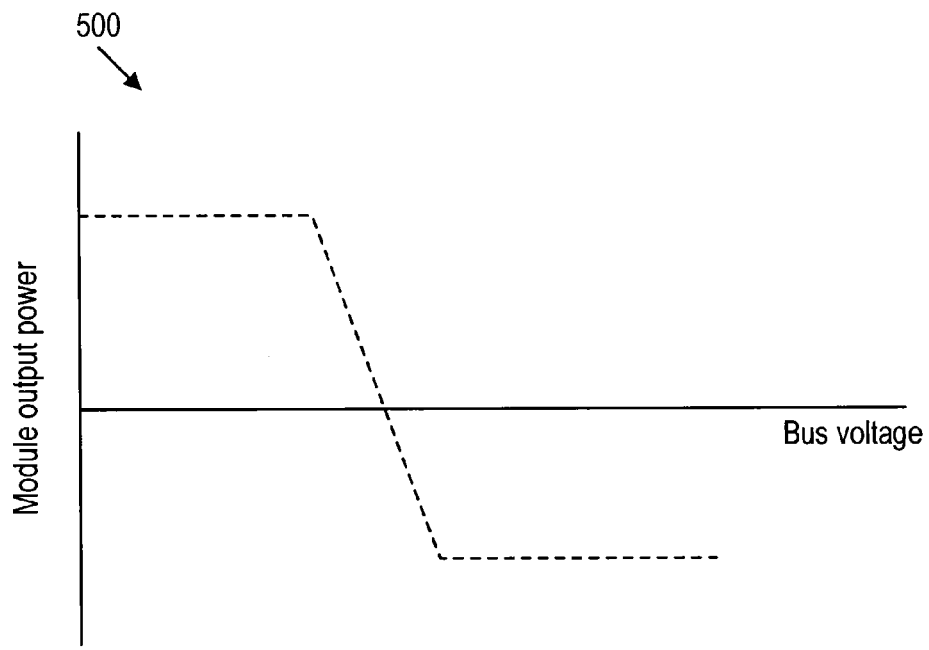
FIG. 5 illustrates an exemplary graph of a voltage-power map.

FIG. 5 is an exemplary illustration of a V-P map 500 that is generated by the central controller 304 for one or more energy modules 302. The V-P map 500 indicates a quantity of output power for the energy module 302 with respect to the voltage of the energy management bus 208. For example, the module output power can be greater than zero, which indicates that the energy module 304 is providing power to the energy management bus 208. When the module output power is less than zero, then the energy module 304 is consuming power from the energy management bus 208, such as during battery cell charging operations.

Referring back to FIG. 4, at step S408, the V-P maps generated at step S406 are transmitted from the central controller 304 to the local controllers associated with the one or more energy modules 302 providing power to the energy management bus 208. The local controllers issue control signals to align the corresponding energy modules 302 to output power to the energy management bus 208 in accordance with the V-P map. The control circuitry of the central controller 304 can be configured to generate and transmit V-P maps for the one or more energy modules 302 at predetermined time intervals based on learned power consumption characteristics of the electrical system of the vehicle and processing speed of the central controller 304 and local controllers. The predetermined time intervals for generating and transmitting the V-P maps can also be based on processing speed of wireless communication circuitry and speed of operation of the DC-DC converters in the modular energy management system 200.

The module control process 402 illustrates how the local controllers at the one or more energy modules 302 interpret the V-P maps transmitted by the central controller 304 and align the energy modules 302 to provide power to the energy management bus 208. At step S410, the control circuitry of the local controllers for the energy modules 302 receive the V-P maps transmitted by the central controller 304 at step S408 of the central control process 400. In some implementations, the energy modules 302 receive unique V-P maps from the central controller 304 due to unequal amounts of power being provided by the one or more energy modules 302.

At step S412, the local controllers of the energy modules 302 read the voltage at the energy management bus 208 to determine a quantity of power to output. As discussed previously, The V-P map indicates a quantity of power for the energy modules 302 to output based on the voltage of the energy management bus 208. In some implementations, the local controllers determine an average voltage at the energy management bus 208 due to power transients that may occur.

At step S414, the control circuitry of the local controller calculates a duty cycle for the modular isolated DC-DC converter 210 to achieve the output power indicated by the V-P map based on the voltage at the energy management bus 208. The amount of power transferred across the isolated DC-DC converter 210 can be based on the duty cycle of the isolated DC-DC converter 210. For example, in order to increase the amount of power transferred from a primary side to a secondary side of the isolated DC-DC converter 210, the duty cycle can be increased.

At step S416, the energy module 302 outputs power to the energy management bus 208 when the local controller issues a control signal to align the modular isolated DC-DC converter 210 in accordance with the duty cycle calculated at step S414 of the modular control process 402. During power transients when the load demand on the modular energy management system 200 increases or decreases, the power storage device 204 reduces the effects of the power transients by providing stored power to the energy management bus 208 or absorbing excess power from the energy management bus 208.

At step S418, the energy modules 302 transmit identification and status information to the central controller 304. For example, for the battery module 202, the local controller can transmit a status signal 306 that includes a rate discharge of the battery cells within the battery module 202 as well as a current SOC of the battery cells.

Figure 6:
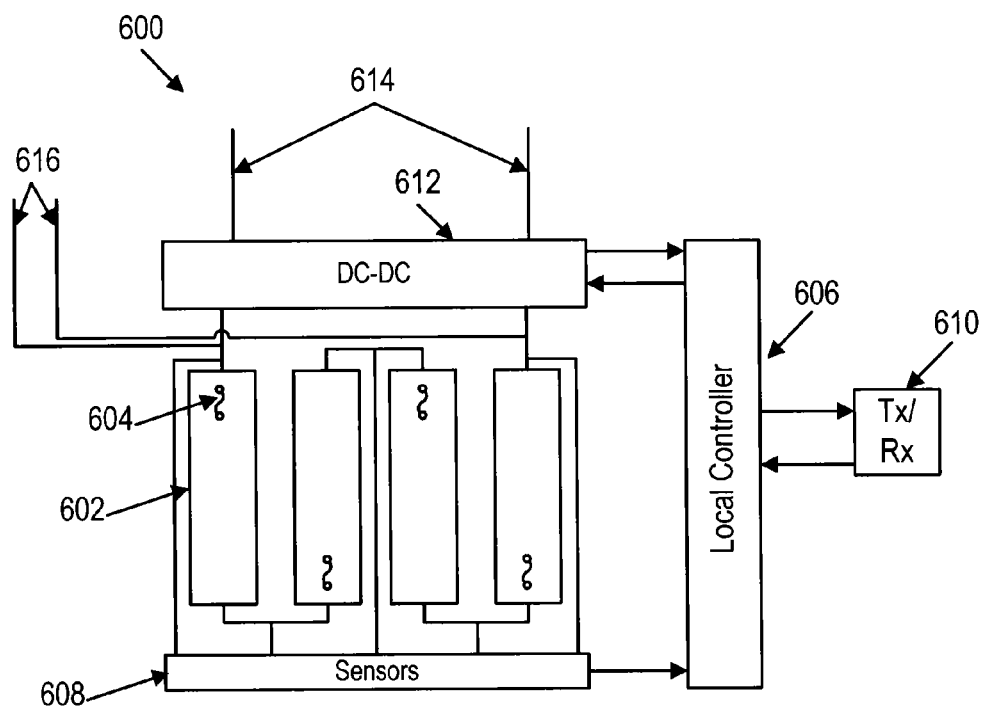
FIG. 6 is an exemplary illustration of an energy module.

FIG. 6 is an exemplary illustration of an energy module 600. The energy module 600 described by FIG. 6 is a battery module, such as the battery module 200, but energy modules having other types of power sources can be included in the modular energy management system 200. For example, solar energy modules, AC charging modules, fuel cell modules, and the like, are other types of energy modules that can be included in the modular energy management system 200. The energy module 600 includes at least one source cell 602, such as a battery cell, a modular DC-DC converter 612, a local controller 606 with a transceiver 610, and sensor devices 608.

As discussed previously, the local controller 606 receives V-P maps from the central controller 304, reads the voltage at the energy management bus 208, and issues control signals to align the modular DC-DC converter 612 to achieve an output power that corresponds to the V-P map. The modular DC-DC converter 612 can be an isolated or a non-isolated DC-DC converter. The local controller 606 also receives sensor values from at least one sensor device 608 that can include temperature, voltage, current, SOC, and other indications related to the at least one source cell 602. The at least one sensor device can also determine if at least one fuse 604 within the at least one source cell 602 has received a trigger event to shut down the at least one source cell 602. For example, the at least one internal fuse 604 can be set to trip on overcurrent, high temperature, overload, and the like. In some implementations, the local controller 606 includes a memory to save the V-P map information received from the central controller 304 and the sensor values received from the at least one sensor device 608.

The local controller 606 communicates with the central controller 304 via the transceiver 610. The transceiver 610 can include at least one transmitter and receiver antenna to receive signals from the central controller 304 and transmit signals to the central controller 304. For example, the local controller 606 can transmit diagnostic information via the transceiver 610 to the central controller 304 related to the energy module 600 and can receive V-P map information from the central controller 304. The transceiver can also be implemented as separate transmitter and receiver devices according to some implementations.

The output signal 614 from the modular DC-DC converter 610 is sent to the energy management bus 208 along with the output of the power storage device 204 to maintain continuous power to the one or more electrical loads 110 of the modular energy management system 200. In some implementations, a high voltage output signal 616 can be output from the energy module 600 upstream of the DC-DC converter 612 to provide power to the vehicle drive train. For example, the high voltage output signal 616 can be connected in series with high voltage output signals from other energy modules to provide power to the vehicle drive train components.

Figure 7:
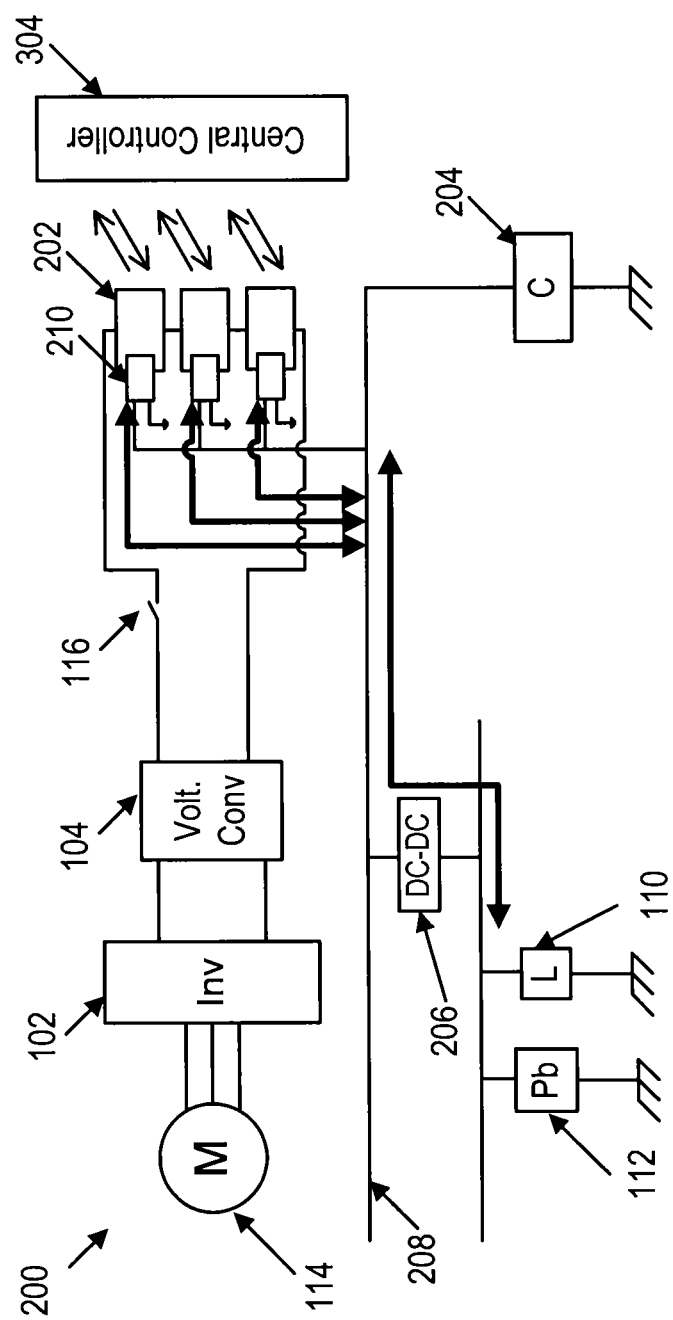
FIG. 7 is an exemplary illustration of power flow through a modular energy management system.

FIG. 7 is an exemplary illustration of power flow through the modular energy management system 200. As discussed previously, the modular energy management system 200 includes at least one battery module 202 that provides power to the inverter 102 and motor 114 via the voltage converter 104 and high voltage relay 116. In addition, the at least one battery module 202 is an energy module that provides power to the energy management bus 208 via the modular isolated DC-DC converter 210. The central controller 304 transmits V-P map information to the at least one battery module 202 and receives module diagnostic data from the at least one battery module 202.

In some implementations, the one or more electrical loads 110 in the modular energy management system 200 can have response times for delivering power that may exceed the response time for power delivery by the Pb battery 112. The energy management bus 208 can transmit power from the at least one battery module 202 and the power storage device 204 to the one or more electrical loads 110 via the DC-DC converter 206. In some aspects, the DC-DC converter 206 is a non-isolated DC-DC converter that can perform DC-DC conversion at higher speeds than isolated DC-DC converters in order to meet the power response demands of the one or more electrical loads 110.

Figure 8A:
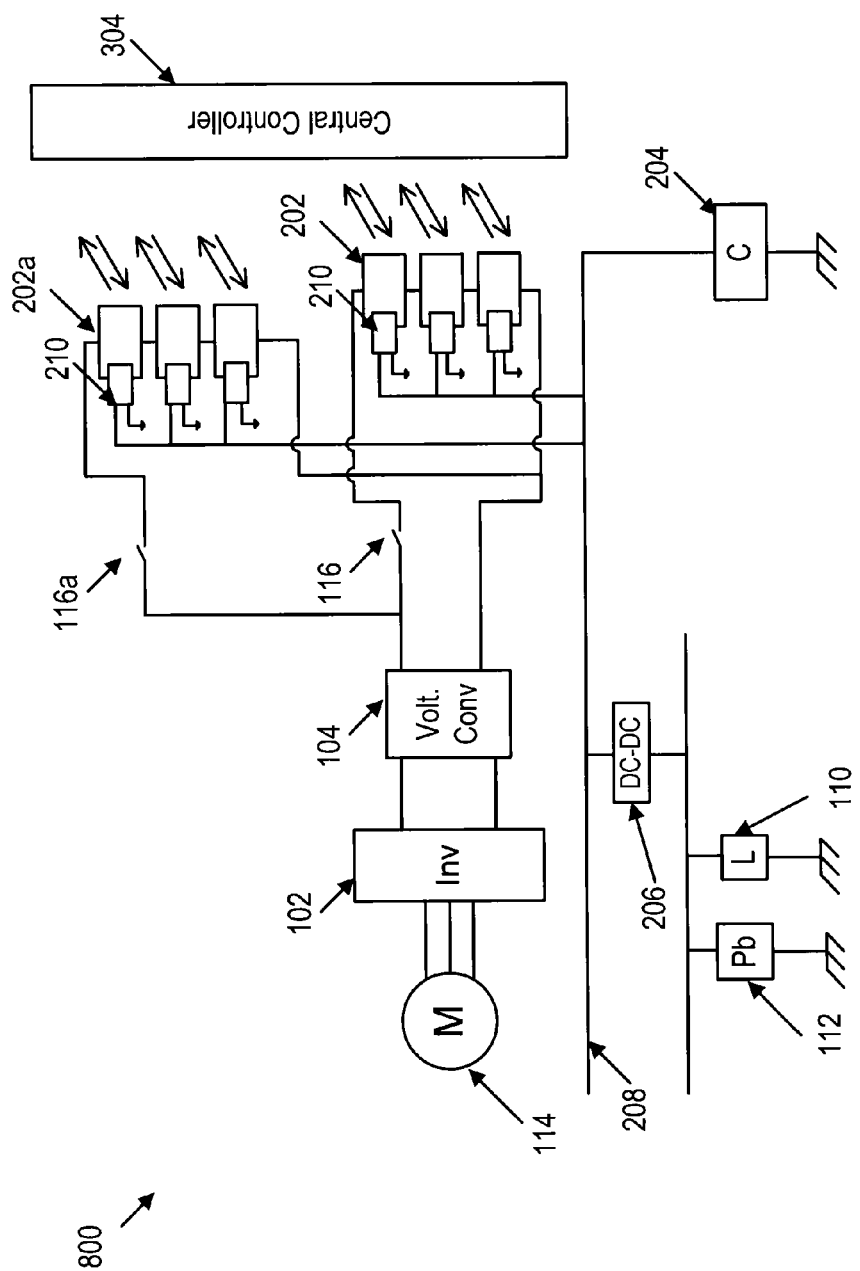
FIGS. 8A-8B are exemplary illustrations of modular energy management systems.

FIG. 8A is an exemplary illustration of a modular energy management system 800 that allows for extended driving ranges and increased power provided to the vehicle drive train of a HV. In addition to the components described previously with respect to the modular energy management system 200, the modular energy management system 800 includes at least one additional battery module 202a that is connected to the voltage converter 104 and vehicle drive train via high voltage relay 116a. In some implementations, the at least one additional battery module 202a is another exemplary implementation of the energy module 600. In some implementations, the at least one additional battery module 202a can be connected to existing modular energy management systems and can communicate with the central controller 304.

In some implementations, the central controller 304 can issue control signals to control operation of the high voltage relay 116a to align power to the vehicle drive train. In order to extend driving range of the HV while maintaining constant power to the vehicle drive train, the central controller 304 maintains one of the high voltage relays 116 or 116a closed. In order increase the power to the vehicle drive train, the central controller 304 can issue control signals to close both of the high voltage relays 116 and 116a.

The at least one additional battery module 202a is also connected to the energy management bus 208 to provide power to the one or more electrical loads 110 via the DC-DC converter 206. The central controller 304 can transmit V-P map information to the at least one additional battery module 202a and can receive module diagnostic data from the at least one additional battery module 202a via wired or wireless communications.

Figure 8B:
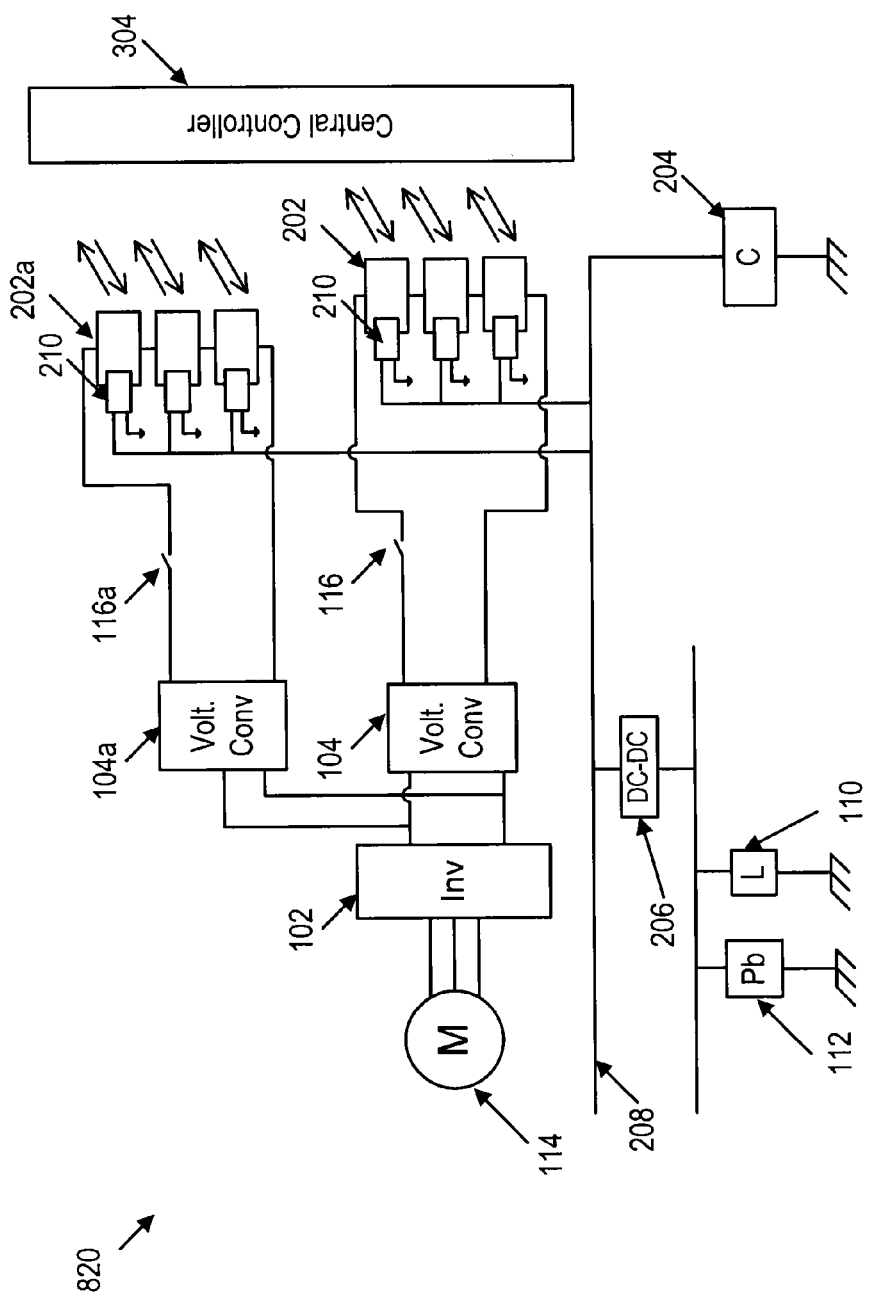

FIG. 8B is an exemplary illustration of a modular energy management system 820 that allows for extended driving ranges and increased power provided to the vehicle drive train of a HV. In addition to the components described previously with respect to the modular energy management system 800, the modular energy management system 820 includes an additional voltage converter 104a to connect the at least one additional battery module 202a to the vehicle drive train. In some implementations, the at least one battery module 202 and the at least one additional battery module 202a have unequal voltage and power characteristics. The additional voltage converter 104a allows the at least one additional battery module 202a to provide power to the vehicle drive train at a voltage that equals the voltage of the power provided by the at least one battery module 202. The modular energy management system 820 can also provide extended range and/or extended power capabilities to the vehicle drive train by controlling operation of the high voltage relays 116 and 116a via the central controller 304 as discussed previously.

The at least one additional battery module 202a is also connected to the energy management bus 208 to provide power to the one or more electrical loads 110 via the DC-DC converter 206. The central controller 304 can transmit V-P map information to the at least one additional battery module 202a and can receive module diagnostic data from the at least one additional battery module 202 via wired or wireless communications.

Figure 9A:
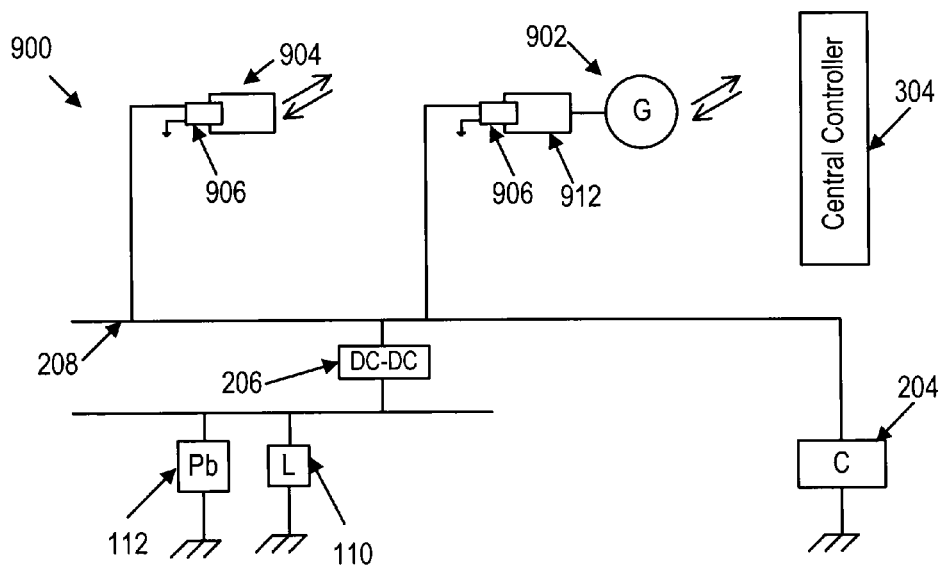
FIGS. 9A-9C are exemplary illustrations of modular energy management systems.
Figure 9B:
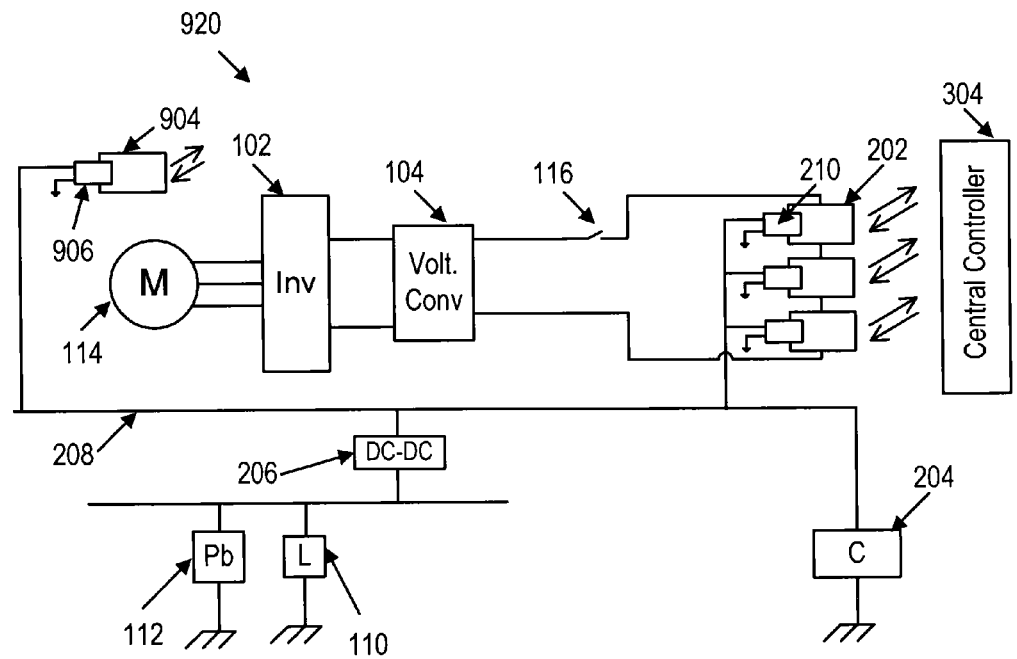
Figure 9C:
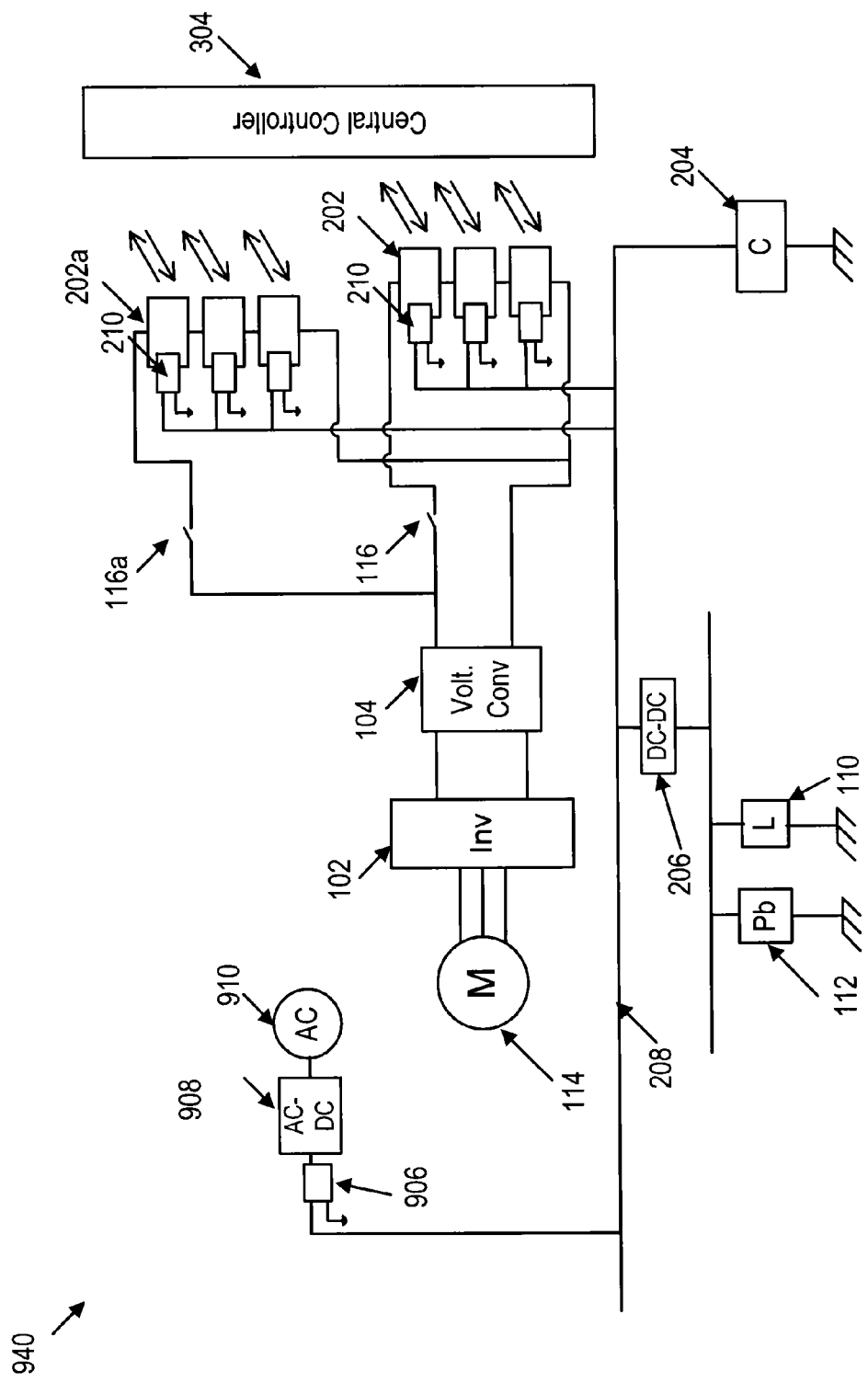

FIGS. 9A-9C are exemplary illustrations of configurations of modular energy management systems. The implementations described with respect to FIGS. 9A-9C show how the modular energy management system can accommodate a plurality of types of energy sources and applications.

For example, FIG. 9A illustrates an exemplary implementation of a modular energy management system 900 in accordance with the International Electrotechnical Commission (IEC) vehicle standards. The modular energy management system 900 includes an alternator 902 connected to the energy management bus 208 via an inverter/rectifier 912 and a modular DC-DC converter 906. The modular DC-DC converter 906 can be isolated or non-isolated. For example, the alternator 902 can function as a generator during regenerative braking so that kinetic energy of the vehicle can be transferred to electrical energy to charge the Pb battery 112 during vehicle braking. A solar energy module 904 is also connected to the energy management bus 208 via the modular DC-DC converter 906. The solar energy module 904 can provide power to the one or more electrical loads 110 via the DC-DC converter 206. The Pb battery 114 can also provide power to the one or more electrical loads 110. The alternator 902 and solar energy module 904 are exemplary implementations energy modules that can communicate with the central controller 302 to receive V-P maps and transmit module diagnostic information.

In some implementations, the power storage device 204 is also connected to the energy management bus 208. During power transients when the from the one or more electrical loads 110 increases or decreases, the power storage device 204 reduces the effects of the power transients by providing stored power to the energy management bus 208 or absorbing excess power from the energy management bus 208.

FIG. 9B illustrates an exemplary implementation of a modular energy management system 920 for a HV. The modular energy management system 920 includes at least one battery module 202 that provides power to the inverter 102 and motor 114 via the voltage converter 104 and high voltage relay 116. In addition, the at least one battery module 202 is an energy module that provides power to the energy management bus 208 via the at least one modular isolated DC-DC converter 210.

The central controller 304 transmits V-P map information to the at least one battery module 202 and receives module diagnostic data from the at least one battery module 202. The energy management bus 208 can transmit power from the at least one battery module 202 and the power storage device 204 to the one or more electrical loads 110 via the DC-DC converter 206. The Pb battery 112 can also provide power to the one or more electrical loads 110. In some implementations, the modular energy management system 920 also includes the solar energy module 904 that is connected to the energy management bus 208 via the modular DC-DC converter 906. The solar energy module 904 can provide power to the one or more electrical loads 110 via the DC-DC converter 206.

FIG. 9C illustrates an exemplary implementation of a modular energy management system 940 for a HV. The modular energy management system 920 includes at least one battery module 202 that provides power to the inverter 102 and motor 114 via the voltage converter 104 and high voltage relay 116. In addition, at least one additional battery module 202a is connected to the inverter 102 and motor 114 via the voltage converter 104 and high voltage relay 116a. The at least one battery module 202 and at least one additional battery module 202a provide power to the energy management bus 208 via at least one modular isolated DC-DC converter 210. In some aspects, at least one fuel cell module (not shown) can also be included as another type of energy module in the modular energy management system 940 that can power the vehicle drive train and energy management bus 208.

The central controller 304 transmits V-P map information to the at least one battery module 202 and additional battery module 202a and receives module diagnostic data from the battery modules. The energy management bus 208 can transmit power from the at least one battery module 202 and the power storage device 204 to the one or more electrical loads 110 via the DC-DC converter 206. The Pb battery 112 can also provide power to the one or more electrical loads 110.

In some implementations, the modular energy management system 940 can include an AC-DC power conversion module 910 that allows the battery modules to be charged via an AC outlet, such as a plug-in charging station. In some aspects, the AC-DC power conversion module 910 can be a pulse width modulation (PWM) rectifier, a power factor correction (PFC) converter, or the like that can receive power from an AC outlet to conduct charging operations.

FIGS. 10A-10C are exemplary graphs that illustrate module efficiency in a modular energy management system, according to an implementation. FIG. 10A illustrates an exemplary graph of DC-DC efficiency for an energy module with respect to quantity of output power from the energy module. FIG. 10B is an exemplary graph of total DC-DC efficiency for a modular energy management system with respect total power output from all of the energy modules. In addition, FIG. 10C illustrates power output from three energy modules as well as total power output with respect to time. The graphs for Module 1, Module 2, and Module 3 shown in FIG. 10C can represent the at least one battery module 202 of the modular energy management system 200, according to some implementations.

As shown in FIGS. 10A and 10B, the DC-DC efficiency of the energy modules varies with respect to quantity output power from the energy modules. In some implementations, the energy modules of the modular energy management system 200 are configured to output a quantity of power that corresponds to an approximate maximum DC-DC efficiency for the energy modules. FIG. 10C illustrates graphs of the power output from the energy modules with respect to time. In some aspects, the control circuitry of the central controller 304 can determine a duty cycle for the energy modules in order to achieve an output power that corresponds to the maximum DC-DC efficiency for the energy modules. For example, if the at least one battery module 202 operates most efficiently at 100 Watts (W) but the desired output power is 50 W, then the at least one battery module can be operated at a 50% duty cycle to achieve the 50 W output power while still operating at approximately maximum efficiency. As shown in FIG. 10C, the timing of the duty cycles for Modules 1, 2, and 3 are staggered so that the total power output to the energy management bus 208 from the at least one battery module 202 remains constant with respect to time.

In conventional electrical systems for HVs, when a damaged battery cell is detected, the conventional electrical system disconnects all of the battery cells from the electrical system to protect the electrical system from high current and temperature stress. However, for implementations of the modular energy management system described herein, the damaged energy modules can be electrically disconnected from the modular energy management system, and the remaining energy modules can continue to operate.

Figure 11:
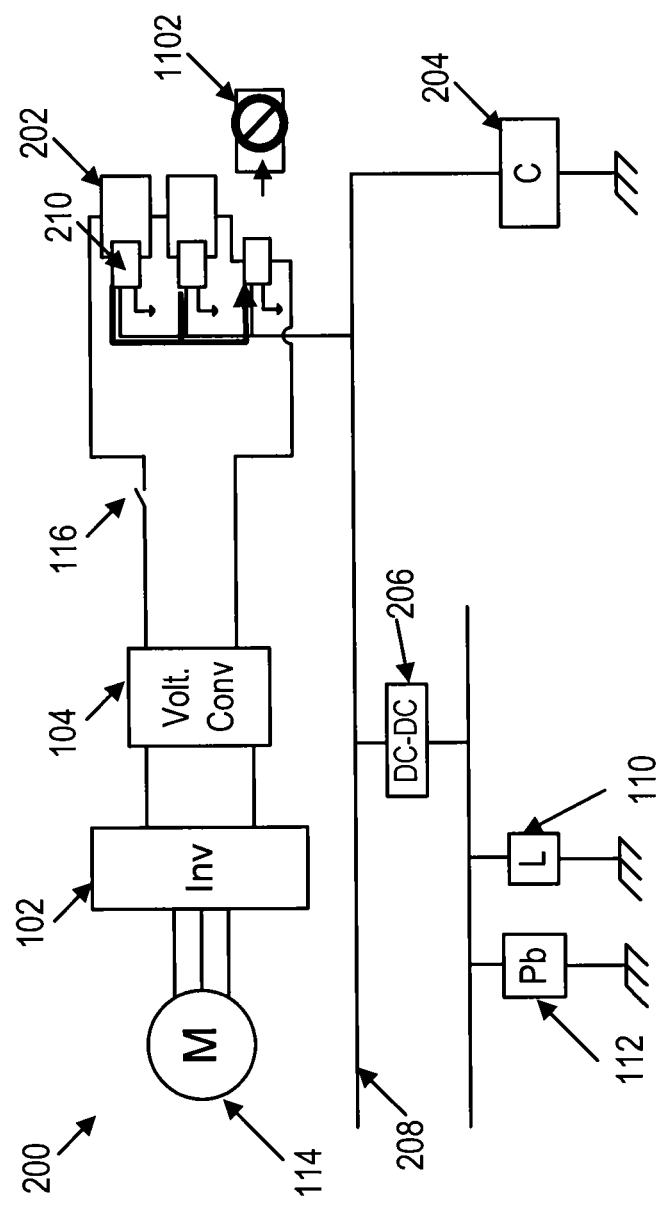
FIG. 11 is an exemplary illustration of a modular energy management system with a damaged module.

FIG. 11 is an exemplary illustration of the modular energy management system 200 with a damaged battery module 1102. If the central controller 304 determines that the battery module 1102 is damaged, the central controller 304 issues a control signal to electrically disconnect the damaged battery module 1102 from the modular energy management system 200. The modular isolated DC-DC converter 210 for the damaged battery module 1102 and the at least one undamaged battery module 202 compensate for the loss of the damaged battery module, and the at least one undamaged battery module 202 can continue to provide power to the vehicle drive train and the energy management bus 208.

Figure 12:
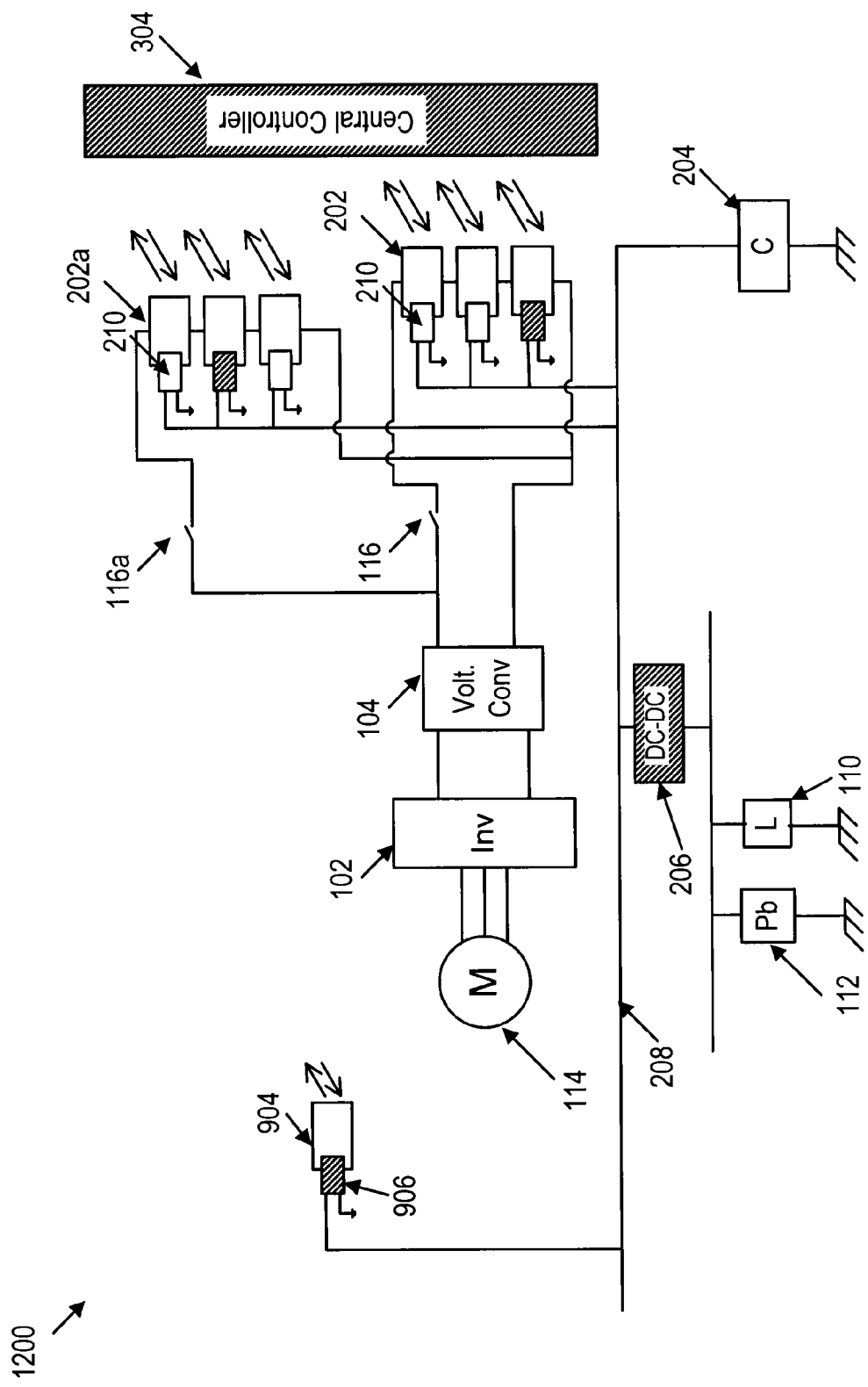
FIG. 12 is an exemplary illustration of a modular energy management system in standby mode.

FIG. 12 is an exemplary illustration of the modular energy management system 1200 in standby mode. The modular energy management system 1200 includes at least one battery module 202 that provides power to the inverter 102 and motor 114 via the voltage converter 104 and high voltage relay 116. In addition, at least one additional battery module 202a is connected to the inverter 102 and motor 114 via the voltage converter 104 and high voltage relay 116a. The at least one battery module 202 and at least one additional battery module 202a provide power to the energy management bus 208 via at least one modular isolated DC-DC converter 210. In addition, a solar energy module 904 is connected to the energy management bus 208 to provide power to the one or more electrical loads 110 via the DC-DC converter 906.

The central controller 304 transmits V-P map information to the at least one battery module 202 and additional battery module 202a and receives module diagnostic data from the at least one battery module 202. The energy management bus 208 can transmit power from the at least one battery module 202 and the power storage device 204 to the one or more electrical loads 110 via the DC-DC converter 206. The Pb battery 112 can also provide power to the one or more electrical loads 110.

In conventional HV electrical systems, when the HV is in a standby mode with only auxiliary electrical loads energized, such as the audio system, heaters, and lights, the electrical system starts up all of the high voltage systems in order to provide power from the Pb battery 112 to the auxiliary electrical loads. By energizing all of the high voltage systems, energy can be wasted, and lifetimes of the Pb battery 112 and other electrical components can be reduced due to unnecessary cycling of the electrical components.

When operating in standby mode, the modular energy management system 1200 can energize one or more electrical components that allow the Pb battery 112 to provide power to the auxiliary electrical loads without energizing all high voltage sub-systems. As illustrated in FIG. 12, the shaded components of the modular energy management system 1200 represent energized components in standby mode according to an implementation. For example, the central controller 304 is energized along with the DC-DC converter 206 connecting the energy management bus 208 to the one or more electrical loads 110, the modular isolated DC-DC converter 210 for one battery module 202 and one additional battery module, and the modular DC-DC converter 906 for the solar energy module 904. In some aspects, a user can select modules via an interface with the modular energy management system 1200 to identify specific modules based on operational demands.

In some implementations, the modular energy management system 1200 may not include the Pb battery 112 or may not power auxiliary electrical loads from the Pb battery 112 when in standby mode. When the Pb battery 112 does not provide power to the auxiliary electrical loads in standby mode, the control circuitry of the central controller 304 aligns power to the electrical loads based on the SOC for the at least one battery module 202 and at least one additional battery module 202a. The central controller 304 can also issue control signals to switch which battery modules provide power to the one or more electrical loads 110 when the modular energy management system 1200 is in standby mode.

FIGS. 13A and 13B are exemplary illustrations of battery SOC control in a modular energy management system. FIG. 13A is an exemplary illustration of SOC management 1300 by the central controller 304. In FIG. 13A, the shaded regions of the at least one battery module 202 and at least one additional battery module 202a represent states of charge for the battery modules. For example, SOCs 1302, 1304, and 1306 represent SOCs for the at least one additional battery module 202a. SOC 1304 represents a highest SOC, SOC 1302 represents a second highest SOC, and SOC 1306 represents a lowest SOC. The at least one additional battery module 202a transmits SOC information to the central controller 304, and the control circuitry of the central controller 304 can determine V-P maps for the at least one additional battery module 202a based on the unequal SOCs between the battery modules.

FIG. 13B illustrates exemplary graphs of the V-P maps for the at least one additional battery module 202a described in FIG. 13A having uneunbalanced SOCs. For example, V-P map 1302a corresponds to SOC 1302, V-P map 1304a corresponds to SOC 1304, and V-P map 1306a corresponds to SOC 1306. As shown in the graphs in FIG. 13B, the V-P map 1304a indicates an amount of output power that is higher than the other V-P maps in FIG. 13B, which means that the additional battery module 202a that is associated with SOC 1304 has a higher discharge rate than the other battery modules.

The V-P map 1302a indicates a second highest amount of output power, which corresponds to the additional battery module 202a that is associated with SOC 1302. In addition, when the voltage of the energy management bus 208 is greater than a predetermined threshold, the additional battery module 202a with SOC 1302 will undergo battery cell charging, which is indicated by the bus voltage values of the V-P map 1302a that have negative output power. The V-P map 1306a indicates that that the additional battery module 202a associated with the lowest SOC 1306 will either output no power to the energy management bus 208 or will undergo battery cell charging based on voltage of the energy management bus 208.

FIG. 14 is an exemplary illustration of battery temperature control 1400 in a modular energy management system. At low temperatures, battery cells can experience high currents that can cause the battery cells to deteriorate at rates that are faster than the deterioration rates at higher temperatures. Therefore, conducting the battery cell warm-up can minimize early deterioration of the battery cells. In some implementations, battery cells are warmed up via an external system that circulates water in pipes around the battery cells via at least one pump until a predetermined average temperature is reached that may correspond to an optimal temperature for battery operation. However, the individual battery cells may be at unequal temperatures, which may cause damage to the battery cells that are not at the optimal average temperature for battery operation.

The implementations of the modular energy management system described herein provide for battery cell warm-up by circulating current between battery cells so that the temperature of the battery cells can be increased by heat caused by internal losses resulting from the circulating current. The control circuitry of the central controller 304 can identify one or more battery modules that are less than a predetermined temperature associated with optimal battery cell operation and align current to circulate between the identified battery modules that are less than the predetermined temperature.

The shaded regions of the at least one battery module 202 shown in FIG. 14 illustrate temperatures of the at least one battery module 202. For example, battery module temperatures 1402 and 1406 are less than the battery module temperature 1404. According to an implementation, the battery module temperatures 1402 and 1406 are less than the predetermined temperature associated with optimal battery cell operation, and the battery module temperature 1404 is greater than the predetermined temperature. The central controller 304 can issue control signals to circulate current between the battery modules associated with battery cell temperatures 1402 and 1406 until the predetermined temperature is reached.

Figure 15:
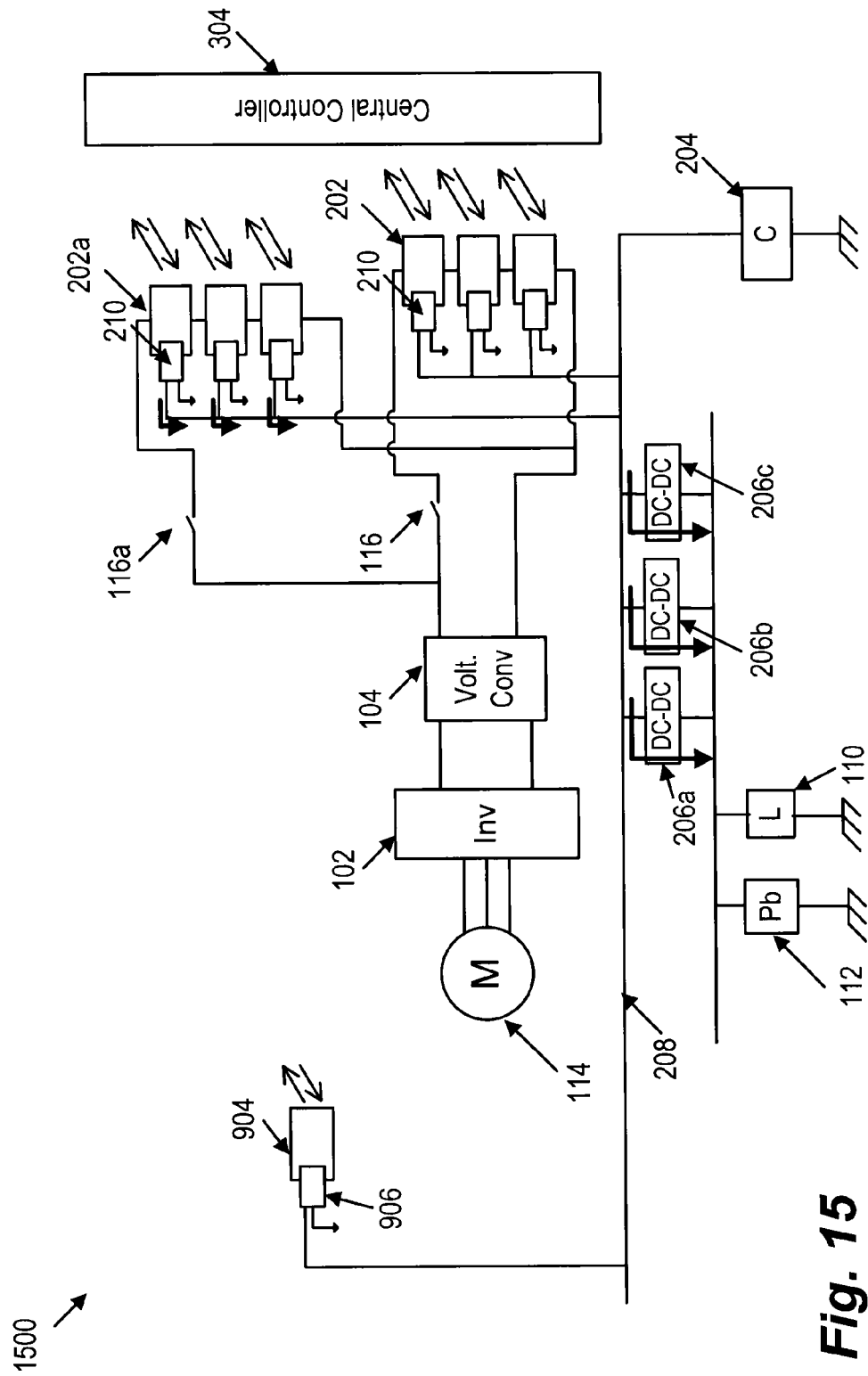
FIG. 15 is an exemplary illustration of redundant power flow in a modular energy management system.

FIG. 15 is an exemplary illustration of redundant power flow in a modular energy management system 1500. The modular energy management system 1500 includes at least one battery module 202 that provides power to the inverter 102 and motor 114 via the voltage converter 104 and high voltage relay 116. In addition, at least one additional battery module 202a is connected to the inverter 102 and motor 114 via the voltage converter 104 and high voltage relay 116a. The at least one battery module 202 and at least one additional battery module 202a provide power to the energy management bus 208 via at least one modular isolated DC-DC converter 210. In addition, a solar energy module 904 is connected to the energy management bus 208 to provide power to the one or more electrical loads 110 via the DC-DC converter 906. With the at least one battery module 202 being independent of the other battery modules, additional redundancy is provided to the modular energy management system 1500 as compared to conventional HV electrical systems that include a single battery pack.

The central controller 304 transmits V-P map information to the at least one battery module 202 and additional battery module 202a and receives module diagnostic data from the battery modules. The energy management bus 208 can transmit power from the at least one battery module 202 and the power storage device to the one or more electrical loads 110 via three DC-DC converters, 206a, 206b, and 206c that are connected in parallel between the energy management bus 208 and the one or more electrical loads 110. The DC-DC converters 206a, 206b, and 206c can be non-isolated DC-DC converters that provide additional redundancy to the modular energy management system 1500 so that power flow to the one or more electrical loads 110 can be maintained. The Pb battery 112 can also provide power to the one or more electrical loads 110.

Figure 16:
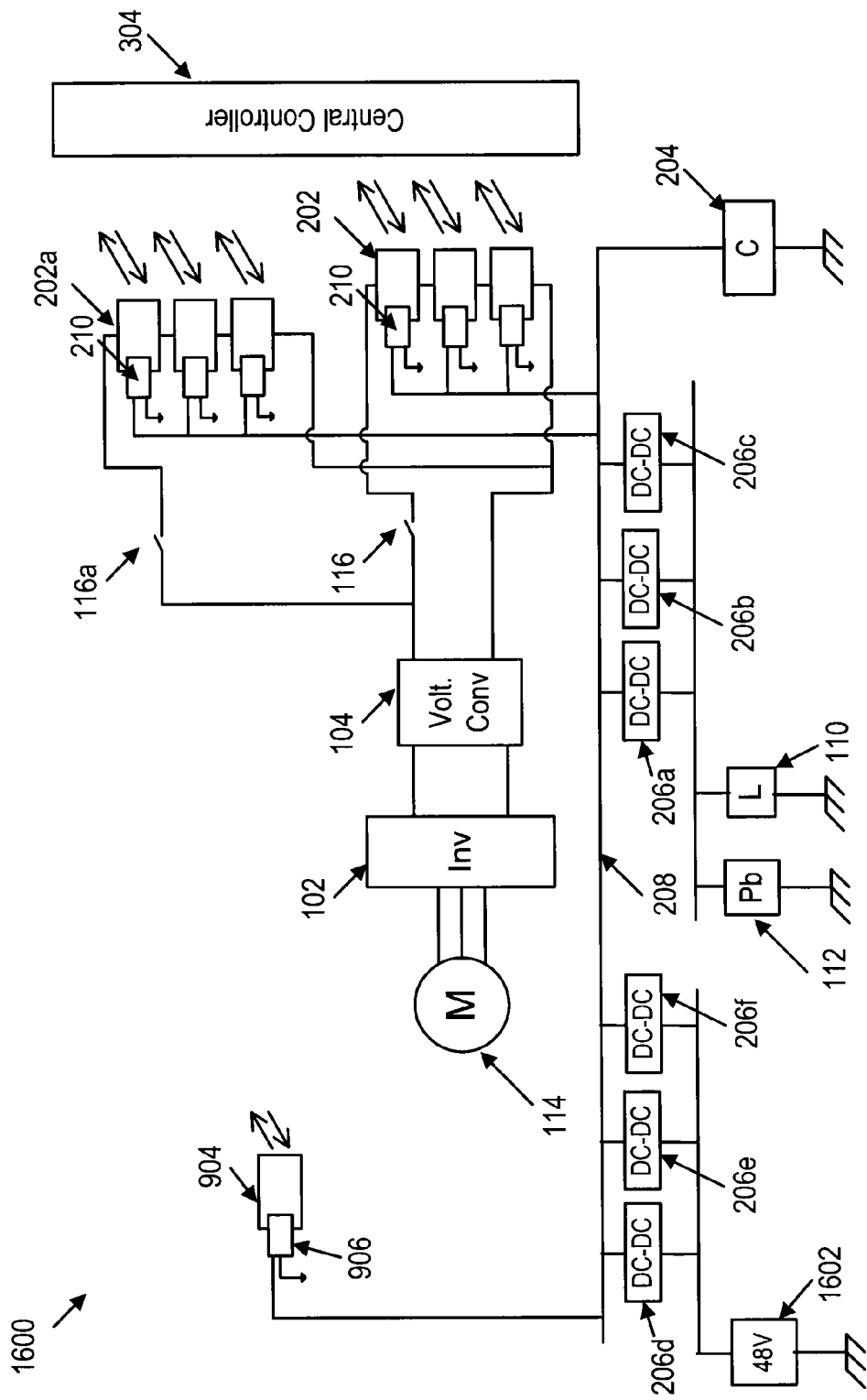
FIG. 16 is an exemplary illustration of a modular energy management system.

FIG. 16 is an exemplary illustration of a modular energy management system 1600 that provides power to middle voltage loads 1602. The modular energy management system 1600 includes the components described with respect to the modular energy management system 1500 as well as middle voltage loads 1602 connected to the energy management bus 208 via DC-DC converters 206d, 206e, and 206f. In some implementations, the one or more electrical loads 110 operate at voltages of approximately 12 Volts (V), and the middle voltage loads 1602 operate at voltages of approximately 48 V. According to some aspects, the middle voltage loads can include components of a HV that consume a quantity of power that may larger than other electric loads in the vehicle, such as electric brakes, power steering, and/or heaters.

The DC-DC converters 206a, 206b, and 206c transfer power from the energy management bus 208 to the one or more electrical loads 110, and the DC-DC converters 206d, 206e, and 206f transfer power from the energy management bus 208 to the middle voltage loads 1602. The DC-DC converters 206d, 206e, and 206f can also be non-isolated DC-DC converters that operate at speeds that can respond to power demands from the middle voltage loads 1602. The modular energy management system 1600 can also provide power to electrical loads that operate at other voltages by adding DC-DC converters at the energy management bus 208 that correspond to the voltage and power characteristics of the one or more electrical loads 110.

Figure 17:
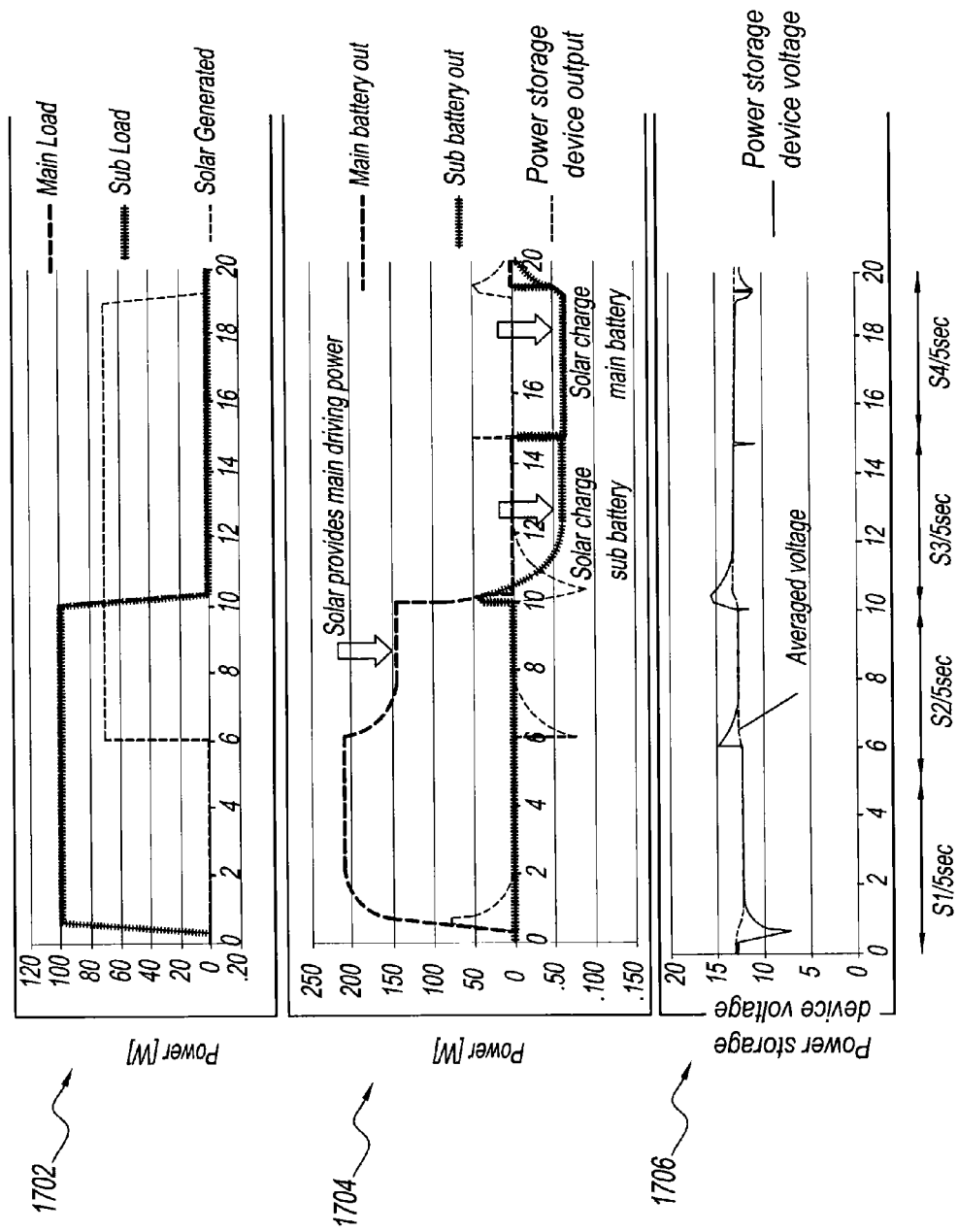
FIG. 17 are exemplary graphs that illustrate power transfer in a modular energy management system.

FIG. 17 illustrates exemplary graphs that show power transfer in the modular energy management system 920 described in FIG. 9B for a time period of twenty seconds. The graph 1702 illustrates power consumption by a main load and a sub load as well as power generated by the solar energy module 904 with respect to time. The main load and sub load can represent any two exemplary loads powered by the modular energy management system 920. The graph 1704 illustrates power output by a main battery, such as the at least one battery module 202, power output by a sub battery, such as the Pb battery 112, and power output from the power storage device 204 with respect to time. The graph 1706 illustrates power storage device voltage and an average power storage device voltage with respect to time. In some implementations, the central controller 304 uses the average power storage voltage to determine V-P maps, voltage at the energy management bus 208, and the like.

During time period S1 from 0 to 5 seconds, the main and sub loads are turned on and are powered by the main battery. In an implementation, the graph 1702 illustrates that the main load and sub load each consume approximately 100 W for a total load demand of 200 W. In graph 1704, from approximately 0 to 2 seconds, as main battery increases output power to respond to the load demands from the main load and sub load, the power storage device 204 provides compensating output power until the main battery reaches approximately 200 W. Graph 1706 also illustrates the voltage drop at the power storage device 204 as the power storage device 204 outputs power to the energy management bus 208 to compensate for a time delay in the power from the main battery reaching the main load and sub load.

During time period S2 during 5 to 10 seconds, the main load and sub load are powered by the main battery as well as the solar energy module 904. As shown in the graph 1702, at approximately 6 seconds, the solar energy module 904 turns on to provide power to the main load and sub load. As the solar energy module 904 takes on about 50-70 W of the load demand, the output power from the main battery decreases to approximately 150 W, as shown in graph 1704. The power storage device 204 absorbs excess power generated during the transient from about 6 to 8 seconds as the solar energy module 904 turns on and the output power from the main battery decreases. Graph 1706 shows how the power storage device voltage spikes as the power storage device 204 absorbs power from the energy management bus during the power transient.

As shown in graph 1702, at approximately 10 seconds, the main load and sub load are de-energized, such as when the modular energy management system 920 goes into standby mode. Graph 1704 shows that for time period S3 between 10 and 15 seconds, the solar energy module 904 charges the sub battery as the curve for the output power of the sub battery decreases below zero. The power storage device 204 absorbs excess power generated during the transient as the main load and sub load are de-energized. Graph 1706 shows how the power storage device voltage spikes as the power storage device 204 absorbs power from the energy management bus during the power transient.

During time period S4 from 15 to 20 seconds, the main load and sub load remain de-energized, and the solar energy module 904 continues to provide power to the energy management bus 208 until just before 20 seconds as is shown by graph 1702. Graph 1704 shows that the solar energy module 904 charges the main battery between 15 and 20 seconds, and charging operations of the sub battery are discontinued. In some implementations, the charging of the main battery and sub battery is controlled by the central controller 304. When the solar energy module 904 ceases to provide power to charge the main battery, charging operations for the main battery are also terminated. As the power output from the solar energy module 904 decreases, the power storage device 204 provides compensating output power until the main battery charging operations end.

Aspects of this disclosure are related to controlling power transfer from energy modules to electrical loads in vehicles. In some implementations, the central controller 304 issues control signals to align the energy modules to provide power to the vehicle drive train as well as the energy management bus 208 that supplies power to the one or more electrical loads 110 via the DC-DC converter 206. The central controller 304 transmits V-P maps to the one or more energy modules that specify how much of the load demand each of the energy modules will carry. In addition, the power storage device 204 is connected to the energy management bus 208 to reduce the effects of power transients at the energy management bus by compensating for voltage drops during increases in load demand or absorbing excess power during reductions in load demand.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 18:
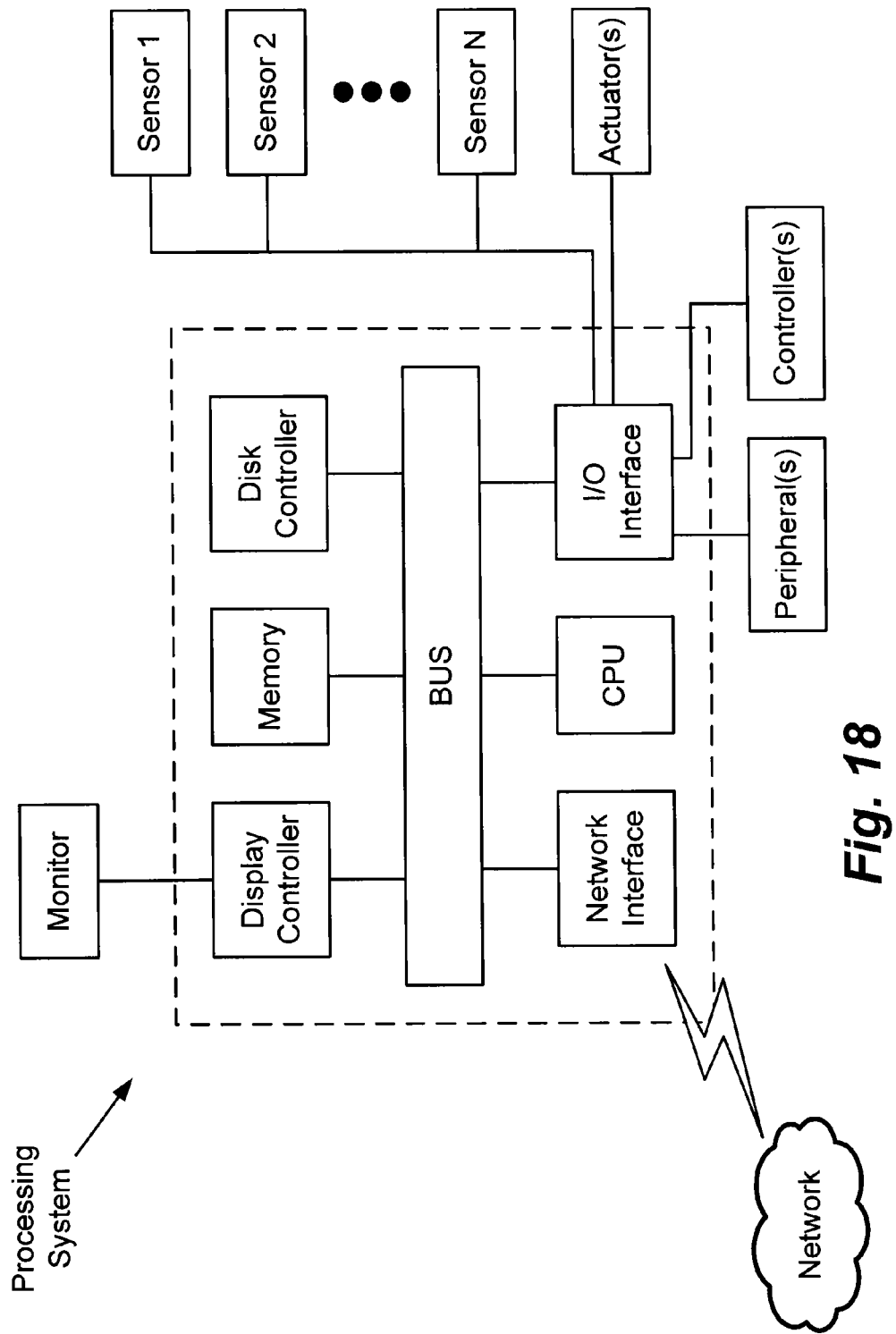
FIG. 18 schematically illustrates a processing system for a processing system, such as a controller and/or a computer system.

FIG. 18 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the modular energy management system. For example, the user can use the controller to select energy modules to provide power to one or more auxiliary electrical loads when the modular energy management system is in standby mode. The I/O interface can also provide an interface for outputting control signals to one or more actuators to control various actuated components, including DC-DC conversion circuitry and other circuitry in the modular energy management system. In some implementations, the actuators send control signals to align transmitter and receiver antennas of the local controller 606 and central controller 304 to send and receive V-P maps.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
   energy modules configured to output power to an energy management bus based on load demands;
   a power storage device configured to compensate for power transients at the energy management bus; and
   control circuitry configured to
   process sensor data to determine voltage-to-power curves that relate module output power to energy management bus voltage for each of the energy modules based on current energy module states and load demands,
   align the energy modules to output power based on the voltage-to-power curves to the energy management bus, and
   provide power to one or more electrical loads at one or more predetermined voltages based on the aligned energy modules.

2. The system of claim 1, wherein the control circuitry is further configured to align the energy modules to output power to a vehicle drive train.

3. The system of claim 2, wherein the energy modules include
   at least one power source configured to provide power to at least one of the energy management bus and the vehicle drive train;
   DC-DC power conversion circuitry configured to convert a voltage of the at least one power source to a voltage of the energy management bus; and
   at least one sensor device configured to measure at least one of temperature, voltage, current, rate of power discharge, and state of charge for the energy modules.

4. The system of claim 3, wherein the energy modules include battery modules having at least one battery cell.

5. The system of claim 4, wherein the control circuitry is further configured to determine the voltage-to-power curves for each the energy modules based on a state of charge (SOC) of the at least one battery cell.

6. The system of claim 3, wherein the control circuitry is further configured to identify the energy modules having one or more battery cells with a temperature less than an optimal temperature for battery operation.

7. The system of claim 6, wherein the control circuitry is further configured to align the energy modules to circulate current between the energy modules having the one or more battery cells with the temperature less than the optimal temperature for battery operation.

8. The system of claim 3, wherein the energy modules include at least one of solar energy modules, AC charging modules, and fuel cell modules.

9. The system of claim 2, wherein the control circuitry is further configured to align one or more additional energy modules to the vehicle drive train to increase at least one of driving range and driving power.

10. The system of claim 1, wherein the control circuitry is further configured to align non-isolated DC-DC power conversion circuitry to transfer power from the energy management bus to the one or more electrical loads.

11. The system of claim 10, wherein the control circuitry is further configured to provide redundant paths of power transfer to the one or more electrical loads from the energy management bus.

12. The system of claim 1, wherein the control circuitry is further configured to select one or more of the energy modules to provide power to one or more auxiliary loads when the system is in a standby mode.

13. The system of claim 1, wherein the control circuitry is further configured to electrically disconnect one or more damaged energy modules from the system.

14. The system of claim 1, wherein the control circuitry is further configured to operate the energy modules at a predetermined efficiency by modifying duty cycles of the energy modules.

15. The system of claim 1, further comprising a lead battery configured to provide power to the one or more electrical loads.

16. The system of claim 15, wherein the power storage device is further configured to reduce stress on the lead battery and the energy modules by outputting power or absorbing power in response to the power transients at the energy management bus.

17. The system of claim 1, wherein the control circuitry is further configured to align the energy modules as electrical loads during battery cell charging operations.

18. A system controller, comprising:
circuitry, configured to
process sensor data to determine voltage-to-power curves that relate module output power to energy management bus voltage for each of a plurality of energy modules based on current energy module states and load demands;
align the energy modules to output power based on the voltage to power curves to the energy management bus; and
provide power to one or more loads at one or more predetermined voltages based on the aligned energy modules.

19. A system comprising:
means for compensating for power transients at an energy management bus;
means for processing sensor data to determine voltage-to-power curves that relate module output power to energy management bus voltage for each of a plurality of energy modules based on current energy module states and load demands;
means for aligning the energy modules to output power based on the voltage-to-power curves to the energy management bus; and
means for providing power to one or more loads at one or more predetermined voltages based on the aligned energy modules.

* * * * *